United States Patent [19]

Rosenbaum

[11] Patent Number: 5,193,913
[45] Date of Patent: Mar. 16, 1993

[54] RF ENERGY SEALABLE WEB OF FILM

[75] Inventor: Larry A. Rosenbaum, Gurnee, Ill.

[73] Assignee: Baxter International Inc., Deerfield, Ill.

[21] Appl. No.: 830,787

[22] Filed: Feb. 4, 1992

Related U.S. Application Data

[63] Continuation of Ser. No. 350,373, May 11, 1989, abandoned.

[51] Int. Cl.⁵ .................... B65D 30/08; B32B 27/06
[52] U.S. Cl. .................... 383/113; 428/36.7; 428/215; 428/520; 428/522; 428/480; 604/403
[58] Field of Search .................. 428/36.7, 215, 480, 428/414, 520, 522

[56] References Cited

U.S. PATENT DOCUMENTS

| | | | |
|---|---|---|---|
| 4,565,742 | 1/1986 | Lang | 428/518 |
| 4,620,999 | 11/1986 | Holmes | 428/520 |
| 4,788,105 | 11/1988 | Mueller et al. | 428/518 |
| 4,826,493 | 5/1989 | Martini et al. | 428/516 |

*Primary Examiner*—P. C. Sluby
*Attorney, Agent, or Firm*—Amy L. H. Rockwell; Paul C. Flattery; Robert M. Barrett

[57] ABSTRACT

A web of film for use in manufacturing flexible containers is provided. In an embodiment, the film comprises a first layer constructed from a non-RF responsive material and a second layer constructed from a RF responsive material. The second layer has a sufficiently greater thickness than the first layer that when sufficient RF energy is applied to the second layer, the first layer is sealed to a second film surface. In an embodiment, the film has three layers. A container constructed from the film is also provided.

21 Claims, 1 Drawing Sheet

RF ENERGY SEALABLE WEB OF FILM

This is a continuation, of application Ser. No. 07/350,373, filed on May 11, 1989, now abandoned.

BACKGROUND OF THE INVENTION

The present invention relates generally to a thermoplastic web of film. More specifically, the present invention relates to a web of film utilized to make flexible containers.

Thermoplastic webs of film can be utilized to create flexible containers for housing products. These flexible containers are utilized, among other areas, in the medical industry for containing, inter alia, parenteral solutions such as intravenous solutions, dialysis solutions, frozen drugs, nutrition products, respiratory therapy products, and plasma. When these containers are utilized in the medical industry, because they will contain fluids or solids that are introduced into a patient's body, it is necessary for the containers to be: essentially transparent; flexible; essentially free of extractables; and capable of maintaining the product contained therein under sterile conditions until the product is accessed or removed from the flexible container.

Therefore, the film from which these containers are constructed must also meet these requirements. It is also important that the film, used in constructing these containers, is sufficiently strong so that the containers constructed from the film have sufficient strength. Furthermore, for economic reasons, it is desirable that any such film be readily constructed into a flexible container on commercially available, or easily adapted, production machinery.

In constructing flexible containers, one method of making a flexible container from a web of film is to seal the web of film, either onto itself, or onto a corresponding web of film, to create the sides of the container for housing the product. One method for sealing such containers is RF (radio frequency) sealing. RF sealing utilizes radio frequency energy to excite the molecules of the film thereby heating the film and causing it to melt and seal to a corresponding surface of a web of film. In this regard, certain plastic materials are RF energy responsive in that, when exposed to radio frequency energy, the molecules of the material or film are excited and thereby heated. As used in this patent application, "RF responsive" or "RF energy responsive" means that the material will be heated to its softening temperature or melting point when exposed only to RF energy between 25 and 30 MHz.

Heretofore some flexible containers have been constructed from polyvinyl chloride. In order to make polyvinyl chloride sufficiently flexible, so that it can be used to create flexible containers, plasticizers have been added thereto. The toxicity of plasticizers has increasingly become a matter of concern both in processing the material into a web of film and in the end use of the film. In the medical industry, typically, diethylheyylphthalate (DEHP) or epoxidized and oils are utilized as plasticizers for polyvinyl chloride. Recently, however, DEHP has become a suspect compound in that there is continued testing to determine if DEHP is a health hazard.

Because the flexible containers, in the medical industry, are utilized to house fluids that are introduced into a patient's body, these containers must be sterilized after they are created. In this regard, it is known to autoclave the containers at temperatures of up to approximately 270° F.

Although there are some materials that would be desirable for constructing flexible containers for use in the medical industry, they have not heretofore been utilized. One of the problems with some of these materials is that, due to their softening temperature, they cannot be utilized to create flexible containers that must be autoclaved. Furthermore, some materials cannot be run on standard or easily modified production machinery to create flexible containers. Moreover, some materials do not seal well to themselves and accordingly, do not create containers having strong seals.

There is therefore a need for a web of film for creating a flexible container that can be used on conventional machinery, such as machinery that utilizes RF energy to create side seals, and that does not contain a DEHP plasticizer.

SUMMARY OF THE INVENTION

The present invention provides an improved web of film. In an embodiment, the web of film does not contain DEHP plasticizers and can be utilized to produce flexible containers on conventional apparatus that utilizes RF welding. Furthermore, flexible containers created from the web of film can be autoclaved.

To this end, the web of film comprises a first layer constructed from a non-RF responsive material (a material that will not be heated to its softening temperature when exposed, alone, to 25-30 MHz RF energy) and a second layer constructed from a radio frequency responsive material. The second layer has a sufficiently greater thickness than the first layer so that when sufficient RF energy is applied to the second layer, the first layer is sealed to a second film surface. Preferably, the layers of film do not include a DEHP plasticizer.

In an embodiment of the present invention, the first layer is constructed from a polyester. In a preferred embodiment of the present invention, the first layer is constructed from a polycyclohexane-dimethylcyclohexane di-carboxylate elastomer.

In an embodiment of the present invention, the second layer is constructed from a polyvinyl chloride that does not include a DEHP plasticizer or epoxidized oil. In a preferred embodiment, the second layer is constructed from a polyvinyl chloride having an ethylene-vinyl acetate copolymer as a plasticizer.

In an embodiment of the present invention, the first layer has a thickness of approximately 0.0002 inches to about 0.0020 inches, the second layer has a thickness of approximately 0.0048 inches to about 0.028 inches, and the film has a total thickness of 0.005 inches to about 0.030 inches.

In an embodiment, the present invention provides a web of film for manufacturing flexible containers to be sterilized at a temperature of at least 230° F. comprising a first, second, and third layer. The first layer is constructed from a non-RF responsive material having a thickness of approximately 0.0002 inches to about 0.0020 inches. The second layer is constructed from a RF responsive material having a thickness of approximately 0.0046 inches to about 0.026 inches. The third layer is constructed from a non-RF responsive material having a thickness of approximately 0.0002 inches to about 0.0020 inches. The total film thickness is approximately 0.005 inches to about 0.030 inches. The first layer is welded to a layer of a web of film having a similar structure by applying RF energy to the web of film.

Preferably, the film is constructed from materials that do not include a DEHP plasticizer or epoxidized oils. Preferably, the first and third layers are constructed from polyester and the second layer is constructed from polyvinyl chloride that does not include a DEHP plasticizer or epoxidized oils.

In an embodiment of the present invention, a container is provided that is constructed from the web of film of the present invention and is sealed onto itself to define an area for housing a product. The container comprises: a first layer constructed from polyester and having a thickness of approximately 0.0002 inches to about 0.0020 inches; a second layer constructed from polyvinyl chloride having an ethylene-vinyl acetate copolymer as a plasticizer, and having a thickness of approximately 0.0046 inches to about 0.026 inches; and a third layer constructed from a polyester and having a thickness of approximately 0.0002 inches to about 0.0020 inches.

An advantage of the present invention is to provide an improved web of film for constructing flexible containers, preferably for use in the medical industry.

Another advantage of the present invention is to provide a web of film that can create containers that can be autoclaved.

Still an advantage of the present invention is to provide a web of film that can be sealed onto itself, or to a corresponding web of film, through RF welding on existing, or easily modified packaging machinery.

Additionally, an advantage of the present invention is to provide a web of film for creating flexible containers for housing medical products.

Moreover, an advantage of the present invention is to provide a web of film that does not include DEHP plasticizers or epoxidized oils.

A further advantage of the present invention is to provide a film structure that can be utilized to produce a flexible bag that can house parenteral products including intravenous solutions, dialysis solutions, frozen drugs, nutrition products, respiratory therapy products, and plasma.

Still an advantage of the present invention is to provide an improved flexible container for housing products.

Furthermore, an advantage of the present invention is to provide a web of film that does not contain potentially harmful or toxic plasticizers.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a web of film capable of being manufactured into flexible containers. More specifically, the film structure of the present invention can be utilized to produce flexible containers capable of containing a fluid or solid to be maintained and removed under sterile conditions. These containers typically consist of a liquid containment body defined by sealed walls. In the medical industry, the containers are utilized to package, inter alia, parenteral products including intravenous solutions, dialysis solutions, frozen drugs, nutrition products, respiratory therapy products, and plasma.

Figure 1:
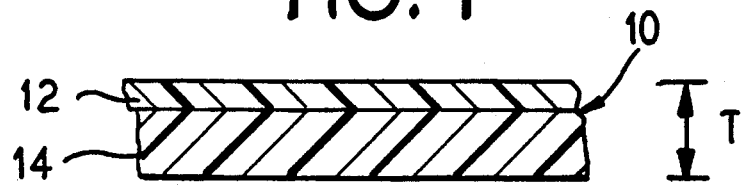
FIG. 1 illustrates a schematic cross-sectional view of an embodiment of the web of film of the present invention.

Referring to FIG. 1, a cross-sectional perspective view of a portion of a film structure 10 of an embodiment of the present invention is illustrated. The film structure 10 includes a first layer 12 and a second layer 14. Preferably, the first layer 12 is constructed from a non-RF responsive material.

In an embodiment of the present invention, the first layer 12 is constructed from polyester. In a preferred embodiment, the first layer 12 is constructed from a polycyclohexane-dimethylcyclohexane di-carboxylate elastomer. A polyester available from Eastman Chemical Products, Inc., Kingsport, Tennessee 37662 under the name "PCCE Elastomeric Polyester" has been found to function satisfactorily.

Preferably, the second layer 14 is constructed from an RF responsive material. As set forth in more detail below, due to the construction of the second layer 14, and the structure of the first layer 12, even though the first layer 12 is not constructed from an RF responsive material, when sufficient RF energy is applied to the second layer, the first layer will be sealed to a surface of another thermoplastic film. It should be noted that if desired, the first layer 12 can be sealed to itself, such as would occur in a form, fill, seal packaging machine.

In an embodiment of the present invention, the second layer 14 is constructed from a polyvinyl chloride material that does not include a DEHP plasticizer or epoxidized oils. In a preferred embodiment, the second layer 14 is constructed from a polyvinyl chloride material that includes an ethylene-vinyl acetate copolymer. The ethylene-vinyl acetate copolymer functions as a plasticizer. A polyvinyl chloride film that does not include a DEHP plasticizer or epoxidized oils available from the Sekisui America Corporation, 780 Third Avenue, Suite 3102, New York, New York 10017, under the tradename "Esmedica V" has been found to function satisfactorily in the present invention.

In constructing a container from the film structure 10, preferably, the first layer 12 is oriented so that it contacts the contents of the container. Accordingly, it is necessary, when the web of film is utilized to construct a container, for the first layer 12 to be able to be sealed to a corresponding first layer 12.

Due to the structure and construction of the film 10 of the present invention, even though the first layer 12 is constructed from a non-RF responsive material, when sufficient RF energy is applied to the second layer 14, the first layer 12 can be welded to a corresponding first layer of a web of film. To this end, the second layer 14 has a sufficiently greater thickness than the first layer 12. Preferably, the first layer 12 has a thickness of approximately 0.0002 inches to about 0.0020 inches. Preferably, the second layer 14 has a thickness of approximately 0.0048 to about 0.028 inches.

Preferably, the film structure has an overall thickness ("T" indicates the thickness of the film in the figures) of approximately 0.005 inches to about 0.030 inches. It has been found that this thickness (T) provides both sufficient strength and flexibility for the web of film 10.

Figure 2:
FIG. 2 illustrates a schematic cross-sectional view of another embodiment of the web of film of the present invention.

Referring now to FIG. 2, another embodiment of the present invention is illustrated. In the embodiment illustrated in FIG. 2, the film structure 20 includes a first layer 22, a second layer 24, and a third layer 26. Again, the film structure 20 provides a film 20 that can be RF welded to itself, or to a film having a corresponding structure.

Preferably, the first and third layers, 22 and 26 respectively, are constructed from a material that is non-RF responsive and the second layer 24 is constructed from an RF responsive material. In an embodiment, the first and third layers, 22 and 26 respectively, are constructed from polyester. In a preferred embodiment, the first and third layers, 22 and 26 respectively, are constructed from polycyclohexane-dimethylcyclohexane di-carboxylate elastomer. A polyester available from Eastman Chemical Products, Inc., under the name "PCCE Elastomer Polyester", has been found to function satisfactorily.

In an embodiment, the second layer 24 is constructed from a polyvinyl chloride that does not include a DEHP plasticizer or epoxidized oils. In a preferred embodiment, the second layer 24 is constructed from a polyvinyl chloride material that includes an ethylene-vinyl acetate copolymer that functions as a plasticizer. Sekisui "Esmedica V" polyvinyl chloride alloy has been found to function satisfactorily.

Again, the layers of the film structure 20 are so constructed and arranged that, even though the first and third layers, 22 and 26 respectively, are constructed from a non-RF responsive material, when sufficient RF energy is applied, due to the second layer 24, the first or third layer can be welded to a corresponding thermoplastic material. To this end, preferably, the first and third layers, 22 and 26 respectively, each have a thickness of approximately 0.0002 inches to about 0.0020 inches. Preferably, the second layer has a thickness of approximately 0.0046 inches to about 0.026 inches. Preferably, the overall film structure 20 has a thickness (T) of approximately 0.005 inches to about 0.030 inches.

The film structure of the present invention provides a film that can be utilized to create a container. The container can be constructed by welding the film through the application of RF energy. Moreover, the resultant container, due to its structure, can be autoclaved at temperatures typically utilized in the industry, e.g., 270° F. Indeed, although in an embodiment of the present invention, the second layer, 14 or 24, is constructed from a material (polyvinyl chloride including an ethylene-vinyl acetate copolymer) that has a softening point of approximately 230° F., a container constructed from the film, 10 or 20, can be autoclaved at approximately 270° F.

Likewise, the structure of the present invention provides a container that when steam sterilized will not exhibit excessive shrinkage. Furthermore, in certain applications, it may be desirable to attach a port or a fitment to the outside of the container. The present invention provides, a film structure 20, in which the surface of the film to which the port is attached will not stick to portions of the port during sterilization.

Figure 3:
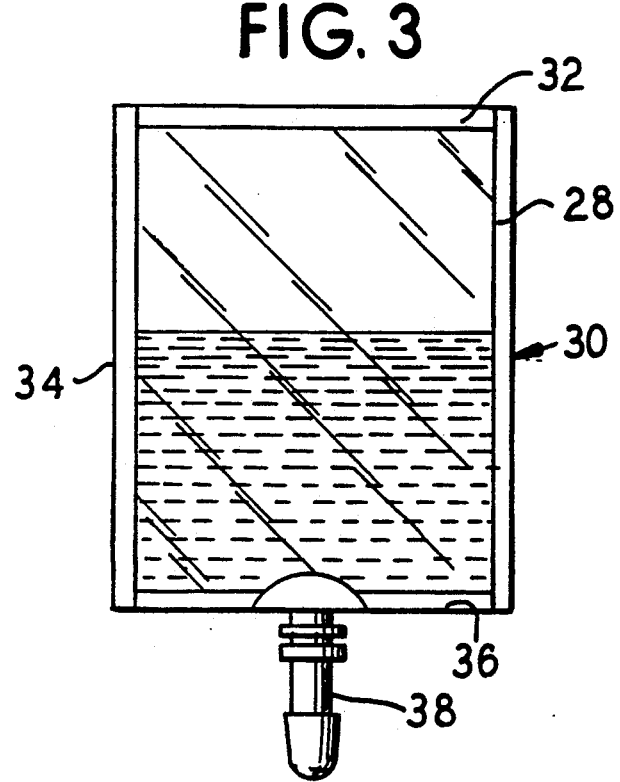
FIG. 3 illustrates a perspective view of a flexible container constructed from an embodiment of the web of film of the present invention.

Referring now to FIG. 3, a container 30 constructed from the film structure 20 of the present invention is illustrated. As illustrated, two inside layers 22 of two film structures 20 are sealed to themselves to create seals 28, 32, 34, and 36. One inside wall 22 can be sealed to another inside wall 22 by RF sealing.

As illustrated, a fitment 38 may be sealed to the outside layer of the container 30. The fitment 38 provides means for accessing the container 30. Preferably, the fitment 38 is heat sealed to the outside layer 26 of the film 20.

In a preferred embodiment, the film structures 10 and 20 are manufactured through a coextrusion process However, the film structures of the present invention can be produced by other methods such as extrusion coating or lamination.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A two-layer web of film for manufacturing flexible, autoclavable containers, said web of film comprising:
    a first layer of polyester;
    a second layer of polyvinyl chloride that does not include a diethylhexylphthalate plasticizer or epoxidized oil;
    the second layer having a greater thickness than the first layer that when radio frequency energy is applied to the second layer, the first layer is sealed to a second layer surface.

2. The web of film of claim 1 wherein the first layer includes a polycyclohexane-dimethylcyclohexane dicarboxylate elastomer.

3. The web of film of claim 1 wherein the second layer is constructed from a polyvinyl chloride having an ethylene-vinyl acetate copolymer as a plasticizer.

4. The web of film of claim 1 wherein the first layer has a thickness of approximately 0.0002 inches to about 0.0020 inches and the second layer has a thickness of approximately 0.0048 inches to about 0.028 inches.

5. The web of film of claim 4 wherein the overall thickness of the film is approximately 0.005 inches to about 0.030 inches.

6. The web of film of claim 5 including a third layer, located on an opposite side of the second layer than the first layer.

7. A two-layer web of film for manufacturing flexible, autoclavable medical containers comprising:
    a first layer of film constructed form a non-radio frequency responsive material that does not include a diethylhexylphthalate plasticizer or epoxidized oil;
    a second layer constructed from a radio frequency responsive material that does not include a diethylhexylphthalate plasticizer or epoxidized oil; and
    the second layer having a thickness that is greater than the first layer that the first layer can be welded to a thermoplastic film by applying radio frequency energy to the second layer.

8. The web of film of claim 7 wherein the first layer is constructed from a polyester.

9. The web of film of claim 7 wherein the first layer includes a polycyclohexane-dimethylcyclohexane di-carboxylate elastomer.

10. The web of film of claim 7 wherein the second layer is constructed from a polyvinyl chloride have an ethylene-vinyl acetate copolymer as a plasticizer.

11. The web of film of claim 7 wherein the first layer has a thickness of approximately 0.0002 inches to about 0.0020 inches and the second layer has a thickness of approximately 0.0048 inches to about 0.028 inches.

12. The web of film of claim 11 wherein the overall film has a thickness of approximately 0.005 inches to about 0.030 inches.

13. The web of film of claim 7 including a third layer, the first layer being located on a first side of the second layer, and the third layer being located on a second side of the second layer, the third layer is constructed form a non-radio frequency responsive material.

14. A three-layer web of film for constructing flexible containers to be sterilized at a temperature of at least 230° comprising:
   a first layer of a non-radio frequency responsive material having a thickness of approximately 0.0002 inches to about 0.0020 inches;
   a second layer of a radio frequency responsive material having a thickness of approximately 0.0046 inches to about 0.026 inches;
   a third layer of a non-radio frequency responsive material having a thickness of approximately 0.0002 inches to about 0.0020 inches; and
   the first layer being welded to a layer having a similar structure by applying radio frequency energy to the web of film.

15. The web of film of claim 14 wherein the film is constructed from materials that do not include a diethylhexylphthalate plasticizer or epoxidized oil.

16. The web of film of claim 14 wherein the first and third layers are constructed from polyester and the second layer is constructed from polyvinyl chloride.

17. The web of film of claim 14 wherein the first and third layers include a polycyclohexane-dimethylcyclohexane di-carboxylate elastomer.

18. The web of film of claim 14 wherein the second layer is constructed from a polyvinyl chloride having an ethylene-vinyl acetate copolymer as a plasticizer.

19. The web of film of claim 14 wherein the first and third layers are constructed from a polycyclohexane-dimethylcyclohexane di-carboxylate elastomer and the second layer is constructed from polyvinyl chloride that does not contain a diethylhexylphthalate plasticizer or epoxidized oil.

20. The web of film of claim 19 wherein the polyvinyl chloride includes an ethylene-vinyl acetate copolymer as a plasticizer.

21. A flexible medical container, capable of being sterilized at a temperature of at least 230° F., for housing under sterile conditions a fluid or solid that can be introduced into a patient, having a body portion with opposed peripherally sealed walls forming the container, the walls of the container being constructed from a three-layer web of film comprising:
   a first layer comprising polyester and having a thickness of approximately 0.0002 inches to about 0.0020 inches;
   a second layer comprising a polyvinyl chloride having a ethylene-vinyl acetate copolymer as a plasticizer, the second layer having a thickness of approximately 0.0046 inches to about 0.026 inches;
   a third layer comprising polyester and having a thickness of approximately 0.0002 inches to about 0.0020 inches.

* * * * *

UNITED STATES PATENT AND TRADEMARK OFFICE
CERTIFICATE OF CORRECTION

PATENT NO. : 5,193,913
DATED : March 16, 1993
INVENTOR(S) : Larry A. Rosenbaum

It is certified that error appears in the above-identified patent and that said Letters Patent is hereby corrected as shown below:

In column 1, line 15, "inter alia" should be underlined

In column 1, line 52, after the word "Heretofore" insert --,--

In column 1, line 60, after the word "epoxidized" delete the word "and"

In column 4, line 12, "inter alia" should be underlined

In column 6, line 55, "form" should be --from--

In column 7, line 17, "form" should be --from--

Signed and Sealed this

Seventeenth Day of May, 1994

Attest:

BRUCE LEHMAN

*Attesting Officer*     *Commissioner of Patents and Trademarks*